April 15, 1969   J. R. HARMSWORTH   3,438,830
METHOD AND APPARATUS FOR FORMING PLYWOOD PANELS
Filed Aug. 16, 1965
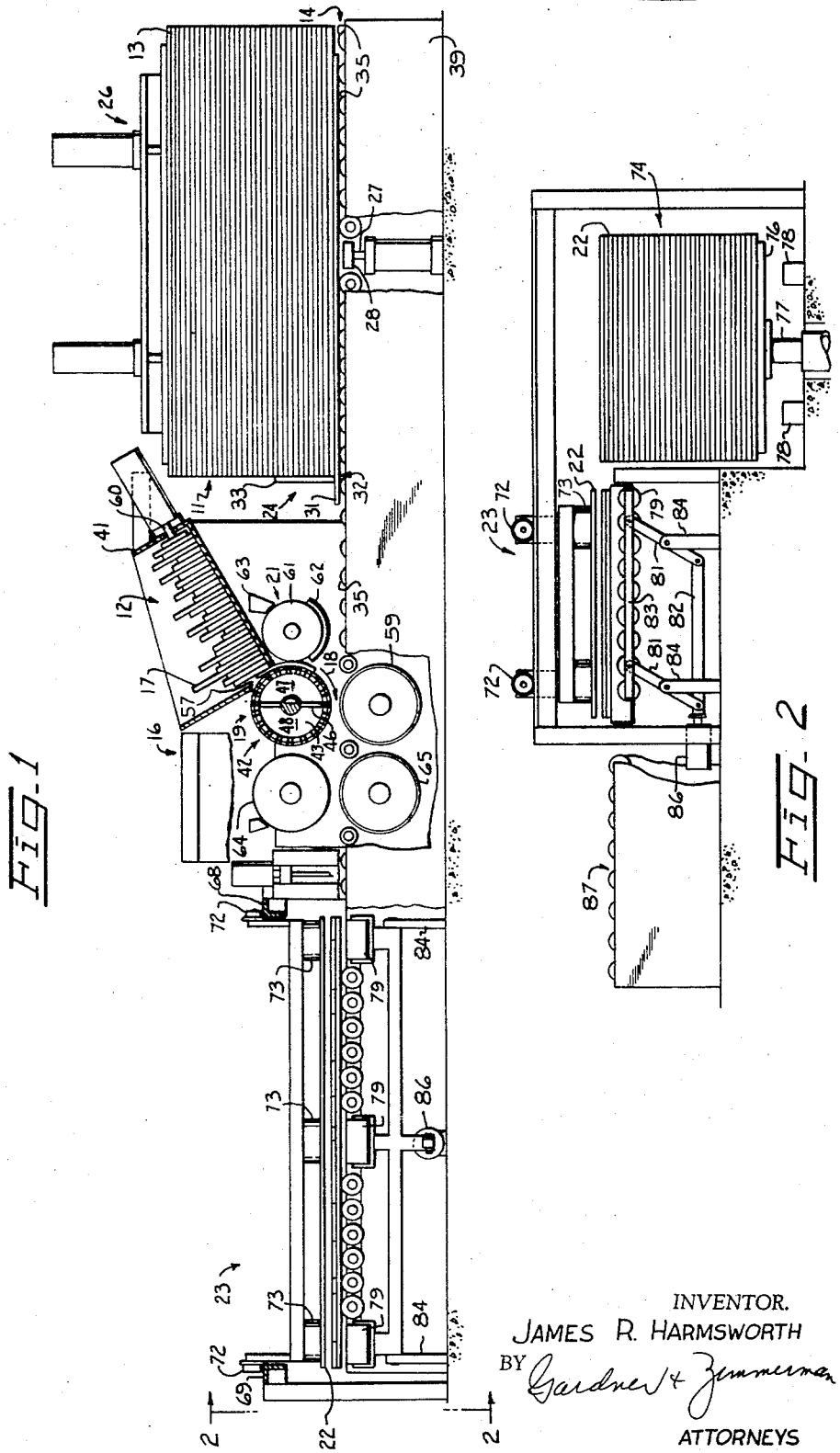
INVENTOR.
JAMES R. HARMSWORTH
BY Gardner & Zimmerman
ATTORNEYS

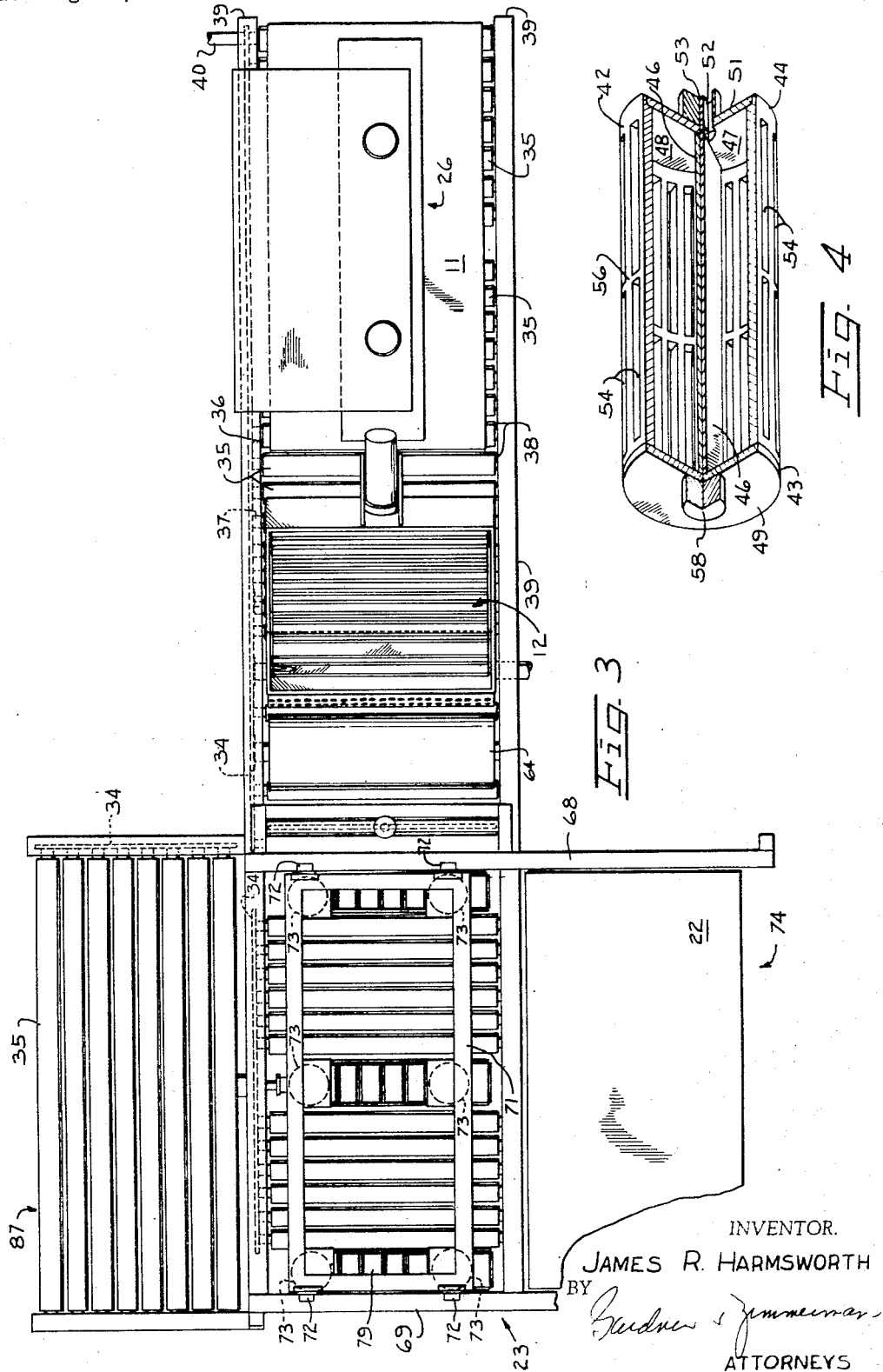

United States Patent Office 3,438,830
Patented Apr. 15, 1969

3,438,830
METHOD AND APPARATUS FOR FORMING PLYWOOD PANELS
James R. Harmsworth, Oakland, Calif.
(410 Dahlia St., Fairfield, Calif. 94533)
Filed Aug. 16, 1965, Ser. No. 479,939
Int. Cl. B32b *31/04;* B27g *11/00*
U.S. Cl. 156—300                      8 Claims

ABSTRACT OF THE DISCLOSURE

A method and apparatus is described for forming structures such as plywood out of laminated ply. The method includes the steps of conveying successive single panels of lamina from a first set of lamina along a first, straight line path while simultaneously conveying lamina from a second set of lamina along an arcuate path to tangentially converge with the lamina of the first set. A coating of an adhesive is applied between the laminas prior to their convergence. The apparatus includes a conveyor for moving the laminas of the first set along the straight line path, and a revolving drum to which lamina of the second set adhere by suction for movement through the arcuate path into convergence with the straight line path and, hence, application of the lamina of the second set to the lamina of the first set.

DISCLOSURE

The present invention relates generally to the manufacture of thin layered laminated sheets. More specifically, it appertains to a laminated sheet forming method and apparatus particularly suited for arranging plies into layers to form plywood panels.

In many cases laminated structural members are preferred over one piece structural members. Such preference generally is encountered, for example, where limitations are imposed on the size, weight and structural strength of structural members. Plywood is a structural material sometimes used when such limitations are encountered. Plywood is used for enumerative purposes, some of the more conventional ones being the construction of flooring, wall paneling, furniture and roof lining. Generally, such plywood is constructed from layers of wood called ply or veneer glued together with adjacent layers having grain arranged at right angles. The number of plies per plywood panel varies. However, it has been the practice to fashion plywood panels from an odd number of plies, with the simplest plywood panel being a three-ply panel. In any case, the outside plies of the plywood panels are respectively referred to as face and back plies with the center ply being called the core. As compared to one piece wood panels, such plywood panels are characterized by being stronger, more resistant to shrinkage, swelling, warping, and twisting, and less likely to split at their ends. Furthermore, the plies comprising the plywood panels may be an intermixture of various woods, such as expensive hard wood face and back plies and less expensive wood cores.

The manufacturing process of plywood is commonly classified into three stages; the log and veneer stages wherein the individual plies are produced, and the lay-up stage wherein the plies are arranged in layers and permanently bonded together to form the final plywood panel product. The method and apparatus of the present invention is an improvement in the lay-up stage of the plywood manufacturing process. More specifically, the method and apparatus of the present invention is an improvement in the technique of superimposing layers of ply and adhesive prior to the application of pressure and heat thereto to form bonded multi-ply plywood panels.

In the manufacture of plywood, one of the chief aims is the development of a simple, rapid, inexpensive, flexible system of superimposing the various layers of ply and adhesive with accompanying minimum waste. Automated procedures are often thought of as providing the agency through which such aims can be realized. Unfortunately however, in the plywood manufacturing art, the automated procedures for superimposing layers of ply and adhesive are characterized by complex machinery requiring, in most cases, a large floor space. Furthermore, various machines employed in the layer superimposing manufacturing processes are inaccurate in that the edges of the plies being superimposed are not maintained in close alignment. Such misalignment results in excessive trimming, hence waste.

More importantly, in the manufacture of any goods, flexibility is a most significant factor. The lay-up procedure in the manufacture of plywood is no exception. As is well known, plywood cores are made either from strips or sheets. Machines employed in and processes of conducting the lay-up procedure generally are characterized by being limited to handling one of the two types of core structures. Hence, to maintain the dual capability of constructing plywood with strip and sheet cores, it would be necessary to have either two different machines at hand, or conduct one of the lay-up processes by hand. On the one hand it would be expensive to maintain the dual capability, while on the other, the lay-up process conducted by hand would be slow as well as expensive relative to an automated process.

Considerable advantage is therefore to be gained by the provision of a method and apparatus which accomplishes the foregoing. More particularly, in the method of the present invention, laminas of a first set are assembled at a location vertically above for individual conveyance to a first station along a conveyor. A lamina from a second set of laminas is conveyed along a first path to the first station to mate with laminas of the first set conveyed along an arcuate path tangentially converging with the first path. The permanent joining of the laminas is accomplished by applying an adhesive between the laminas before they are mated and then subjecting the superimposed laminas and adhesives to conventional pressure and heating techniques. The flexibility of the method of the present invention will become more evident from the description to be set forth hereinafter detailing the possible variations in conducting the subject lay-up method depending on the nature of the core ply desired. In addition, by assembling the first set of laminas above the conveyance path of the second set of laminas, and conveying the laminas of the first set along an arcuate path to converge with the laminas of the second set, efficient use of the overhead of the conveyance path is effected, hence, a reduction in the floor space requirements.

To conduct the foregoing method, the present invention also includes a unique apparatus to facilitate superimposing layers of lamina and adhesive in the manufacture of laminated structures. The apparatus includes conveyance means to transport a lamina from a first set along a path including a straight line section to a first station along the straight-line section of the conveyance. Laminas of a second set, either in the form of strips or sheets, are stored vertically above the first station of the conveyance. Also included in said apparatus is at least one suction wheel conveyor having a hub defining at least one compartment communicated to a suction generator and including a rim defining at least one aperture communicated with the hub positioned to engage by suction the surface of a lamina of the second set. As the wheel is turned, the engaged lamina is conveyed to tangentially converge in surface to surface relation with a lamina of the first set at which point the suction is released. An adhesive applicator is positioned to coat at least one of the facing surfaces of the converging laminas. As can be seen from the above description and as will be further elaborated hereinafter, the lamina-adhesive superimposing apparatus of the present invention is flexible and lends itself to an uncomplicated, simple and compact construction while most accurately placing the laminas in their desired relative superimposed positions.

Accordingly, it is a principal object of the present invention to provide a flexible automated system for forming laminated structures.

More particularly, it is an object of the present invention to provide a plywood lay-up system capable of constructing plywood sheets having either strip or sheet type cores.

Another object of the present invention is to provide an automated system for superimposing layers of lamina and adhesive to form a laminated structure with minimum waste.

Yet a further object of this invention is to provide plywood lay-up apparatus which is simple, uncomplicated, compact and flexible.

Still another object of the present invention is to provide a multi-station conveyor automated system for conducting plywood lay-up operations with minimum floor space requirements.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

FIGURE 1 is a diagrammatic side elevation view of one embodiment of a plywood lay-up apparatus of the present invention adapted to conduct a method embodiment of the invention.

FIGURE 2 is an end elevation view of the apparatus of FIGURE 1 taken along line 2—2 thereof.

FIGURE 3 is a top plan view of the plywood lay-up apparatus of FIGURE 1.

FIGURE 4 is a detailed enlarged partial section view of a slotted cylinder embodiment of the suction wheel ply conveyor of the present invention.

Considering now the method of the present invention in some detail with reference to the accompanying drawings, it is contemplated that first there will be provided at least first and second sets of assembled plies. Assembled plies of the second set are arranged to be conveyed at a selected rate along a defined path to arrive at a first station therealong at selected intervals. Although the plies of the second set may be placed on a conventional power driven conveyor manually, it is more expedient to control the delivery of the second set plies automatically. Towards this end, it is desirable to assemble the second set of plies in a magazine, transferring automatically therefrom on command single plies to the conveyor.

The first set of plies are conveyed along a defined arcuate path which tangentially converges to the first path at the first station thereof. Such conveyance may be accomplished by delivering the plies to various conveyance means such as driven circumjacent first and second belts arranged to receive and convey the plies therebetween, or first and second series of juxtaposed rollers disposed along circumjacent paths and arranged to convey the plies therebetween. However, for the sake of simplicity and compactness of structure, it is preferred to utilize a driven suction wheel conveyor to accomplish the delivery of the plies of the first set to the aforementioned first station. Such an apparatus will be set forth in more detail hereinbelow with reference to the apparatus of the present invention.

Preferentially, first set plies are stored in a magazine mounted vertically above the first station. These plies are withdrawn singularly on command from the magazine by securing by suction the plies to a revolving member, for example, a wheel, which is operated to travel the above noted arcuate path. The plies are individually withdrawn by the revolving suction member and guided thereby to convergingly meet and be superimposed the second set of plies. By appropriately adjusting the rate of conveyance of the second set plies relative to the speed of revolution of the suction member or wheel, the first set of plies can accurately be positioned on the second set of plies.

In order to permanently join the superimposed plies, a coating of adhesive must be applied between the superimposed plies. This may be accomplished in various ways. For example, the adhesive coating may be applied by a wheel or brush applicator to the upper surface of the second set of plies as they are withdrawn from their magazine and conveyed to the first station. Alternatively, a wheel type adhesive applicator may be positioned proximate the revolving suction member so that the first set of plies pass therebetween as they are conveyed from their magazine with adhesive being applied to one of their surfaces.

If the steps of the method of the present invention are conducted in accordance with the description set forth hereinabove, a two-ply panel will ensue. However, in constructing conventional plywood, it must be remembered that the plies of the first and second sets must be oriented so that they are conveyed to be superimposed with their respective grains arranged perpendicular with respect to one another.

If panels of more than two plies are desired, the two-ply panels can be conveyed from the first station to subsequent stations where additional layers of ply may be added. Such additional layers of ply preferably are superimposed on the multi-ply panels in accordance with the steps of the method set forth above for superimposing the first set plies on the second set plies. It may be desirable in some cases to accomplish the superposition of third and additional layers of ply by other techniques. For example, panel size plies may be conveyed to be set down on the multi-ply panels in planar face to face relationship therewith. One exemplary means capable of accomplishing such a superposition of plies is an overhead mounted movable carriage assembly including suction cup means to grasp individual panels and convey them to a station along the conveyance path, and set them on top of the multi-ply panel located thereat.

As is seen from the description of the method of the present invention thus far presented, there are many possibilities in the manner of forming complete plywood panels in accordance with the method of the present invention. However, this flexibility is further emphasized when it is considered that, by this method, strip-type core plywood can be constructed as easily as sheet-type core plywood. More specifically, sheet-type core three-ply plywood is formed by conveying back ply along a level path to a first station therealong. The back ply is conveyed with its intended outside surface facing downward. The sheet-like core, selected to be comparable in size to the backing ply, is conveyed along an arcuate path tangentially converging with the level path. The core is set on the back ply with its grain oriented perpendicular to and its edges aligned with those of the back ply. The superimposed back and core ply defines a two-ply structure. Adhesive is applied between the plies in a manner described supra.

To superimpose the front ply on the two-ply structure, the two-ply structure is conveyed to a second station. At this station, the front ply may be set on the core ply of the two ply structure in a manner similar to the superposition of the core ply.

Now, in the construction of strip-type core plywood it is preferable to modify some of the steps of the method slightly, although, it should be pointed out that it is not necessary to institute such modifications. Firstly, since a plurality of strips are necessary to cover a panel of back ply, it is preferred to control the conveyance and setting of the core strips on the back ply so that only those required are delivered to the first station thereby minimizing waste. Although this can be controlled by an operator of the machinery by observing the process, automatic control is preferred. In the case of identically sized strips, such automatic control can be accomplished by setting the core conveyor to deliver a given number of the strips to the first station. Of course, the number of strips delivered would vary in accordance with the size of the plywood panels being formed where the core strips are of various sizes, the automatic control can be accomplished by monitoring the total width footage of core strips conveyed to the first station. The conveyance of the core strips is controlled to be terminated when the total width footage of the core strips is comparable to the coextending dimension of the back ply upon which they are to be set.

In order to make certain that disturbance of the core strips is maintained at a minimum during the plywood formation, it is preferable that the front ply be set on the strip coreback ply structure in face to face converging relation. Such may be accomplished by conveying the front ply to planarly converge with the superimposed strip core ply at a second station to set thereon in edge alignment therewith. The aforedescribed overhead mounted movable carriage assembly can be employed to set the front ply on the superimposed strip core ply. In all of the hereinabove noted cases, once the plywood panels have the desired number of superimposed layers of plywood, they are conveyed to suitable presses and ovens to permanently set the plies.

Preferred apparatus for conducting the foregoing method of the present invention is delineated in FIGURES 1–4 wherein such apparatus is embodied as a system for superimposing layers of lamina and adhesive to form laminated structures. Although the method was described in reference to the manufacture of plywood panels, it is noted that with the advent of new adhesives the method and apparatus of the present invention is adaptable to forming laminated structures other than those of wood. For example, thin sheets of metal can be formed into laminated structures. The only limitations encountered in forming laminated structures of other materials is that the material be flexible, capable of being joined by an adhesive, and of sufficient strength to withstand the slight rigors of the method and operations of the apparatus employed therein. However, for the sake of brevity, the description of the apparatus of the present invention will be made with reference to the plywood formation process.

Referring to the figures, it is seen that the plywood forming apparatus comprises first and second sources of plywood 11 and 12 respectively. Plies 13, for example, back plies, from source 11 are transported by a suitable conveyor 14 to a first station 16 whereat they are superimposed with plies 17, for example, core plies, from source 12 located vertically spaced thereabove. Plies 17 are transported over an arcuate path, designated by arrow 18, to station 16 by a revolving member 19 adapted to extract the plies from source 12 and retain them thereagainst by suction. To apply adhesive between the layers of plies, an adhesive applicator 21, such as the wheel type liquid adhesive applicator, is mounted juxtaposed to revolving member 19. The applicator 21 is arranged to coat the inner surface of plies 17 with adhesive as they are transported thereby to station 16. Additional layers of plies, for example, for front plies 22, may be set thereon with similar apparatus at other stations along conveyor 14. However, alternative apparatus, such as an overhead mounted crane-like suction lift and conveyance assembly 23 can be employed to superimpose layers of ply. Also, the two-ply structure formed from plies 13 and 17 could be collected after emerging from station 16 and placed on conveyor 14 to be transported again to station 16 whereat another layer of ply would be superimposed thereon. Of course, this procedure could be repeated until a laminated structure of the desired number of plies is obtained.

The plywood forming apparatus will now be considered in detail as arranged to construct three-ply strip core plywood. As noted in the figures, source 11 of back plies 13 comprises a magazine 24 positioned above and at one end of conveyor 14. Magazine 24 is adapted to store and deliver upon command plies 13 to conveyor 14. The control of the delivery of plies 13 to conveyor 14 is effected by hydraulically operated press 26 mounted above and operated to force plies 13 down against conveyor 14. Plies 13 are maintained spaced above conveyor 14 by a pneumatically operated piston 27 and head 28 of an electrically controlled hydraulic jack 29. On command, the piston 27 is retracted, hence allowing the plies 13 to settle against conveyor 14. Conveyor 14 withdraws the lower most ply 31 of the plies 13 through an aperture 32 defined by an adjustable gate 33 mounted in one of the walls of magazine 24 and transports same to the first station 16. Gate 33 is adjustable to allow varying thickness members to pass through aperture 32.

Although other of the various conveyors can serve equally as well as conveyor 14, that portrayed in the drawings is a single strand sprocket driven chain 34 coupled to horizontally arranged rollers 35 at one side 36 thereof by individual idler sprockets 37. The other side 38 of each roller 35 is journally mounted to the conveyor frame 39. The conveyor 14 assembly is driven by a conventional motor driven chain drive system (not shown) coupled to drive shaft 40 of the drive sprocket of the single strand sprocket driven chain 34. To facilitate better gripping of the plies 13 by the rollers 35 of conveyor 14, the rollers are covered with rubber sleeves.

Strip core ply segments 17 are assembled in a second magazine 41 mounted above the first station 16 along conveyor 14. As viewed in FIGURE 1, the strip ply 17 is arranged to have its grain oriented in the same direction as it will be when superimposed on ply 13, it being remembered that the grain orientation of strip ply 17 is to be opposite to that of ply 13. To accomplish the withdrawal of strips 17 from magazine 41 and their superposition on back ply 13 a unique revolving member 19 illustrated in FIGURES 1 and 4 is employed. More specifically member 19 comprises a hollow cylinder 42 extending the width of the conveyor 14 to define first and second opposite ends 43 and 44 respectively. The interior region defined by hollow cylinder 42 is divided by a plate 46 into first and second sealed apart chambers 47 and 48 respectively. Plate 46 is mounted within cylinder 42 to sealingly and slidably engage along three of its edges the inner periphery of cylinder 42 and a first end plate 49 secured to close end 43 of the cylinder. The remaining edge of plate 46 is rigidly secured to a second end plate 51 journally mounted to close the remaining end 44 of cylinder 42. Preferably plate 46 is arranged to bisect the interior region of cylinder 42 along its longitudinal axis.

End plate 51 defines at least one aperture 52 which allows gas flow communication between a selected chamber, e.g., 47, defined by plate 46 and the exterior of cylinder 42. End plate 51 is adapted to connect a conduit 53 thereto in gas flow communication through aperture 52 to selected chamber 47.

The cylinder 42 is permeated by pores, slots or other aperture forms 54 to provide a gas flow path therethrough. Suction holding along the outer surface 56 cylinder 42 is accomplished by coupling a suction generator (not shown), such as a vacuum pump or other means for establishing a negative pressure, to conduit 53. By using rubber for the surface of cylinder 42, the gripping power can be increased.

In operation, revolving member 19 is mounted above station 16 proximate an aperture 57 defined at one end of second magazine 41. The revolving member 19 is positioned so that the outer surface 56 of cylinder 42 defines an arcuate path 18 extending from aperture 57 of magazine 41 to tangentially converge to a plane which is parallel to the plies 13 on conveyor 14 and spaced a distance thereabove approximately equal to the thickness of the core ply segments 17. The revolving member 19 is mounted by fixing journalled end plate 51 in place with plate 46 resting in a vertical position and selected chamber 47 proximate magazine 41. The opposite end plate 49 is coupled via a drive shaft 58 connected thereto to suitable means for imparting rotary motion thereto. From the above description, it is seen that as cylinder 42 is revolved, journalled end plate 51 remains stationary. Hence, the chamber 47 region upon which a negative pressure is pulled is always proximate magazine 41. By operating the suction generator, core strips 17 will adhere by suction to permeated cylinder 42 and be withdrawn from magazine 41. To insure good contact between strips 17 and permeated cylinder 42, magazine 41 is adapted to receive a piston 60 which is operated to force the strips 17 against the aperture 57 of magazine 41. The withdrawn strips are transported along path 18 to the tangent point of path 18 and the back plies 13 at station 16. As the strips 17 pass through this point, the suction hold on strip plies 17 is released since that surface portion of cylinder 42 is no longer communicated to the negative pressure source. This releasing of the strip plies 17 is abrupt. Consequently, by synchronizing the speed of conveyor 14 with that of revolving member 19 accurate superposition of strip core plies 17 on back plies 13 can be accomplished.

Although plate 46 was specifically illustrated and described as longitudinally bisecting cylinder 42, it is noted that plate 46 may be positioned to define a chord, or formed to define an included angle. In any case, it is only necessary that plate 46 be arranged to defined sealed apart chamber regions 47 and 48. Furthermore, the cylindrical revolving member 19 may be substituted for by one or more axially aligned thin wheels, each constructed in accordance with the structure of the member 19 illusrtated in FIGURE 4.

To press the plies 13 and 17 together and thereby facilitate the removal from therebetween of adhesive pockets, a first idler drum roller 59 is journally mounted in slight vertically movable relation to conveyor frame 39 in vertical alignment with and spaced below revolving member 19. The drum roller 59 and revolving member 19 are arranged to receive plies 13 conveyed thereto by conveyor 14. The space between roller 59 and member 19 is adjusted to be slightly less than the thickness of the multi-ply member defined by superimposed plies 13 and 17. In addition, if it is desired to adapt the apparatus to handle varying number of layers of ply or plies of varying thickness, the elevation of conveyor 14 and drum 59 relative to the revolving member 19 can be made adjustable.

As in the case of rollers 35, the cylinder 42 and idler drum roller 59 each have a surface composed of rubber to facilitate gripping.

To apply a coating of adhesive between the plies 13 and 17, a glue drum 61 including a catcher 62 for excess and a sprout 63 for filling is provided. The drum is rotatably mounted proximate revolving member 19 at a distance just less than the thickness of the strip plies 17 conveyed by member 19. The glue drum 61 applies a coating of glue in the conventional manner to the side of the strip plies 17 to be set on plies 13.

As the glued two-ply structure is conveyed from the first station 16 it passes to a second station whereat the structure is directed to pass between first and second vertically spaced rotatably mounted drums 64 and 66 respectively. The top drum 64 serves as a glue applicator, applying a coat of adhesive to upper face of the strip core ply in preparation to placing the front ply thereon. The bottom drum 65 serves as an idler drum roller and is spaced relative to drum 64 to provide additional pressing together of the previously superimposed plies.

At a third station along conveyor 14, a hydraulically driven cutter 67 is mounted transverse to the conveyance path. Cutter 67 is employed to true the opposite ends of the strip core ply structure which are transverse to the conveyance path.

Front plies 22 are placed on the strip core plies 17 superposed on back plies 13 at the final station prior to the conveyance of the completed strip core plywood panels for permanent fixing of the plies. The superimposing of the front panels 22 is accomplished by an overhead carriage assembly 23 including first and second parallel rails 68 and 69 respectively mounted horizontally above a second section of rollers. A rectangular frame 71 is slidably mounted to be guided over rails 68 and 69 by flanged wheels 72 rotatably mounted proximate each of its corners. A plurality of suction cups 73 are mounted to the underside of frame 71 at space locations thereabout. The suction cups 73 are operated to securely hold the front panels 22 as they are conveyed from their magazine 74 and set on the superimposed multi-ply panels.

With particular reference to FIGURE 2, it is seen that the front plies 22 are stored on a platform 76 mounted to be vertically moved by a pneumatic piston 77. When not in operation, the load is removed from jack 77 by setting platform 76 on supports 78. However, in operation, the overhead carriage assembly 23 is positioned over magazine 74. The jack 77 is energized to lift platform 76 until suction cups 73 engage the surface of the topmost front ply. The cups are energized to grip the ply and the carriage is moved to a position over the multi-ply panels to which the front ply is to be joined.

The multi-ply panel, including core and back plies, is delivered by conveyor 14 to a vertically adjustable second set of rollers 79. The rollers 79 are translated vertically by a piston actuated lever mechanism including a plurality of vertically oriented lever arms 81. The first end of the lever arms 81 are pivotally connected to horizontally piston driven rod 82. The opposite ends of the lever arms 81 also are pivotally connected to frame 83 supporting rollers 79. The lifting of rollers 79 is accomplished by truncatingly supporting each of the lever arms 81 proximate their respective midpoints by struts 84. By energizing piston mechanism 86, the lever mechanism raises the second set of rollers 79 until the plies residing thereon encounter the front ply held by carriage assembly 23. The front ply is then released by suction cups 73 to allow it to set on the core ply thereby forming a three-ply plywood panel. Final pressing and trimming operations, for example, as set forth hereinbefore, is accomplished by placing the panel on a second driven roller conveyor 87 which delivers the panels to the requisite processing stations. At the completion of the pressing and trimming operations the panels are delivered to large presses and ovens where the plies of the panels are permanently set.

Although the operation of the above described plywood forming system could be manually controlled, it lends itself most readily to automatic operation through conventional timing and switching circuits.

What is claimed is:
1. A method of arranging the plies and core to form plywood, the steps comprising:
 (a) assembling plies of a first set in a magazine positioned at one end of a straight line conveyor,
 (b) assembling plies of a second set in a magazine positioned vertically above a first station of said conveyor,
 (c) withdrawing one ply of said first set from said magazine,
 (d) conveying said ply of said first set along said conveyor to said first station,
 (e) securing one ply of said second set by suction to the surface of a revolving member which travels an arcuate path to tangentially converge to planar alignment with said conveyor at said first station, said ply of said second set secured to said member to be conveyed thereby to have its grain perpendicular to the ply of said first set,
(f) revolving said member with said ply of said second set secured thereto,
(g) applying a coating of adhesive to the surface of said ply of said second set to be set adjacent said ply of said first set,
(h) superimposing in planar alignment said ply of said second set on said ply of said first set,
(i) conveying said superimposed plies along said conveyor to a second station, and
(j) repeating steps (e) through (h).

2. A method of arranging a ply and strip core to form strip core plywood, the steps comprising:
(a) assembling panel size plies of a first set at one end of a straight line conveyor,
(b) assembling strips of ply material vertically above a first station of said conveyor,
(c) conveying one panel-size ply of said first set along said conveyor to said first station,
(d) securing a strip of said ply material by suction to the surface of a revolving member which travels an arcuate path to tangentially converge to planar alignment with said conveyor at said first station, said strip secured to said member to be conveyed thereby to have its grain perpendicular to the panel size ply of said first set,
(e) revolving said member with said strip secured thereto,
(f) applying a coating of adhesive to the surface of said strip to be set adjacent said ply of said first set,
(g) superimposing in planar alignment said strip on said panel-size ply of said first set, and
(h) repeating steps (d) through (g) until said panel-size ply is covered by said strips.

3. The method as recited in claim 2 further defined as comprising the additional steps of,
(a) conveying said strip covered panel-size ply along said conveyor to a second station,
(b) superimposing a panel-size ply of a second set on the strip formed ply of said strip covered panel-size ply, the grain of said second set panel-size ply arranged parallel to the first set panel-size ply, and
(c) applying a coating of adhesive between the strips and said panel-size ply of said second set.

4. The method as recited in claim 2 further defined as comprising the additional steps of
(a) conveying said strip covered panel-size ply along said conveyor to a second station,
(b) securing one panel-size ply of a second set by suction to the surface of a revolving member which travels an arcuate path to tangentially converge to planar alignment with said conveyor at said second station, said ply of said second set secured to said member to be conveyed thereby to have its grain parallel to the panel-size ply of said first set,
(c) revolving said member with said ply of said second set secured thereto,
(d) applying a coating of adhesive to the surface of said ply of said second set to be set adjacent said strip formed ply, and
(e) superimposing in planar alignment said ply of said second set on said strip formed ply of said strip covered panel-size ply.

5. Apparatus for arranging laminas into layers to form at least two-ply laminated structures, the combination comprising:
(a) a first magazine adapted to store laminas therein,
(b) conveyor means for transporting lamina from said first magazine to a first station along a straight line section of said conveyor,
(c) a second magazine adapted to store lamina therein mounted above said conveyor at the first station thereof,
(d) at least one suction wheel conveyor for transporting lamina from said second magazine to said first station along an arcuate path tangentially converging to said first station comprising,
    (1) a fixed hub defining at least one compartment proximate said arcuate path, said compartment adapted to be communicated to a suction generator,
    (2) a rim defining at least one aperture therein mounted in sealing journal relation to said hub to engage the surface of said lamina stored in said second magazine, said aperture defining a gas flow path through the rim to the hub interior, said rim adapted to be revolved about said hub to engage said rim and lamina from said second magazine by suction force through said rim aperture and hub compartment and convey said lamina to be superimposed on said lamina of said first magazine, and
(e) adhesive applicator means positioned to apply an adhesive coating between the laminas prior to their superimposition.

6. The apparatus as recited in claim 5 further defined by said suction wheel conveyor comprising
(a) a hollow permeated cylinder mounted at the first station to horizontally extend transverse to the path of conveyance of said lamina from said first magazine in sliding relation to the lamina stored in said second magazine, a first end of said cylinder provided with a fixed end plate and the opposite end provided with a second journally mounted end plate,
(b) a plate mounted to said fixed end plate within said cylinder in slidable sealing relation to remaining interior surfaces thereof to longitudinally divide said cylinder into first and second chambers, said chamber proximate said second magazine adapted to be communicated to a suction generator, and
(c) means to rotate said cylinder coupled to the fixed end of said cylinder.

7. The apparatus as recited in claim 6 further defined by said adhesive applicator being a drum type liquid adhesive applicator mounted spaced apart said suction wheel conveyor along a parallel axis on the arcuate path side of said wheel conveyor, said applicator positioned to coat a surface of the laminas transported by said wheel conveyor with adhesive.

8. Apparatus for arranging plies into layers to form plywood panels comprising,
(a) a straight chain driven roller conveyor,
(b) a first magazine for storing plies mounted over said conveyor at one end thereof,
(c) pneumatic piston means supporting said plies in said magazine off said conveyor and on command allowing a ply to be placed on said conveyor for transportation thereby to a first station,
(d) a second magazine for storing plies mounted above said first station of said conveyor,
(e) means for transporting plies from said second magazine along an arcuate path to tangentially converge at said first station in grain perpendicular relation with plies transported by said roller conveyor to therewith form a two-ply panel,
(f) a first drum type liquid adhesive applicator mounted adjacent said arcuate path to coat the surface of the ply from said second magazine which is placed adjacent the ply from said first magazine,
(g) vertically opposed second drum type liquid applicator and idler roller mounted at a second station along said straight conveyor to receive said two-ply panel from said first station and apply adhesive to the top ply,
(h) a cutter blade mounted at a third station to trim the edges of said two-ply panel, and (i) means to superimpose a third ply on the two-ply panel in grain perpendicular relation to said top ply of the two-ply panel.

References Cited

UNITED STATES PATENTS

| 3,322,592 | 5/1967 | Preusser et al. | 156—570 X |
| 3,379,601 | 4/1968 | Pagay | 156—571 X |
| 3,389,038 | 6/1968 | Robison | 156—570 X |
| 1,686,605 | 10/1928 | Ermold | 156—571 X |
| 2,318,215 | 5/1943 | Gans | 156—561 X |
| 3,200,027 | 8/1965 | Fairest | 156—571 X |
| 3,202,564 | 8/1965 | Carter | 156—571 X |

EARL M. BERGERT, *Primary Examiner.*

H. ANSHER, *Assistant Examiner.*

U.S. Cl. X.R.

156—560, 570, 578